Feb. 23, 1954　　　W. P. FRANKENSTEIN　　　2,670,123
CARTON
Filed July 28, 1949　　　　　　　　　　　　　　7 Sheets-Sheet 1
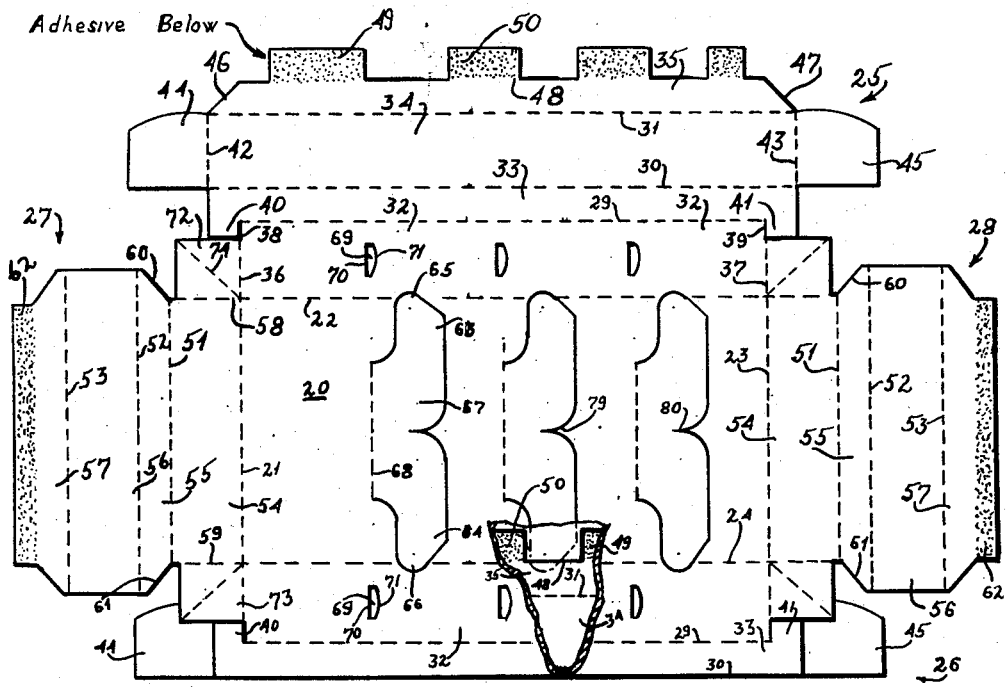
Fig. 1.
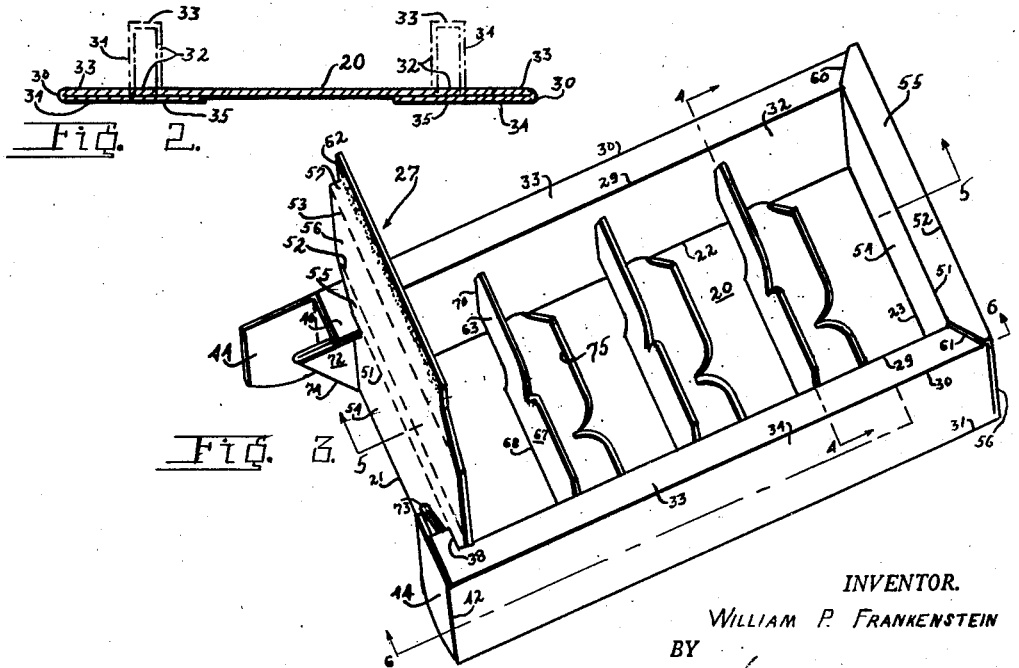
Fig. 2.
Fig. 3.
INVENTOR.
WILLIAM P. FRANKENSTEIN
BY
Joseph A. Pave
ATTORNEY Feb. 23, 1954 W. P. FRANKENSTEIN 2,670,123
CARTON
Filed July 28, 1949 7 Sheets-Sheet 2

INVENTOR.
WILLIAM P. FRANKENSTEIN
BY
Joseph A. Rave
ATTORNEY

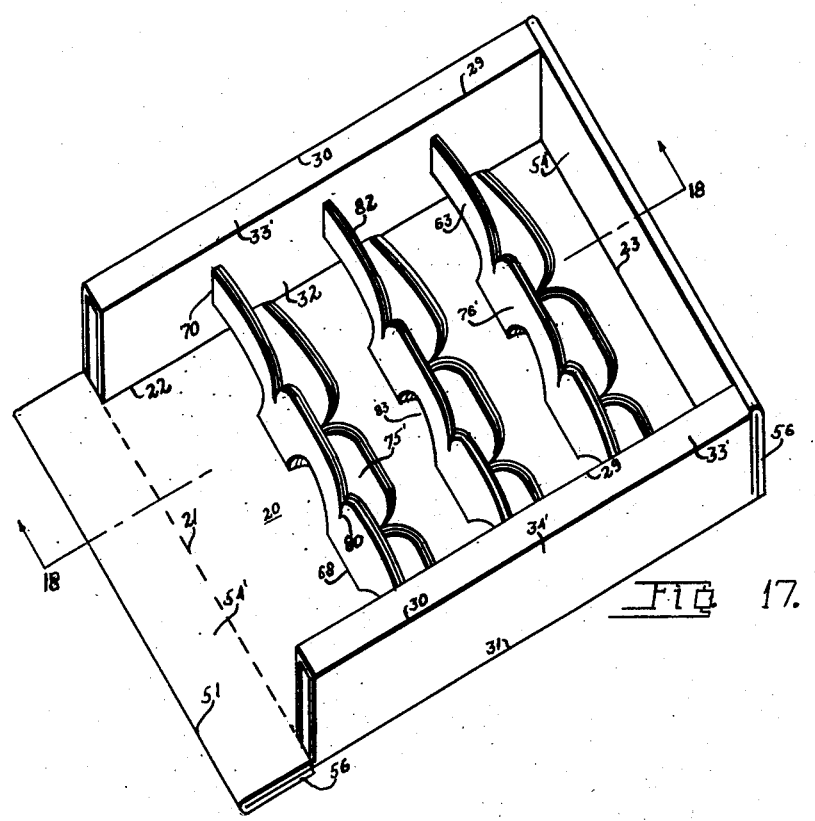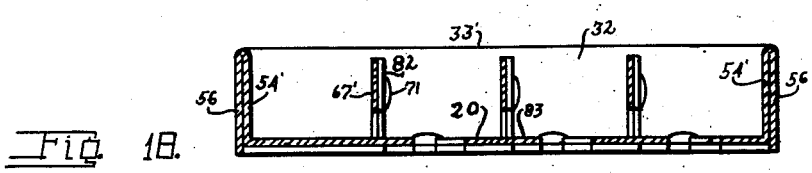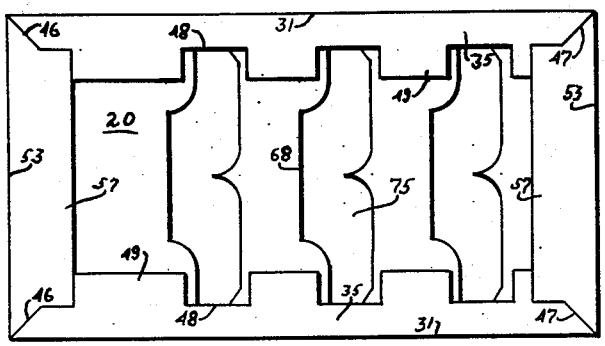

Feb. 22, 1954 W. P. FRANKENSTEIN 2,670,123
CARTON
Filed July 28, 1949 7 Sheets-Sheet 4
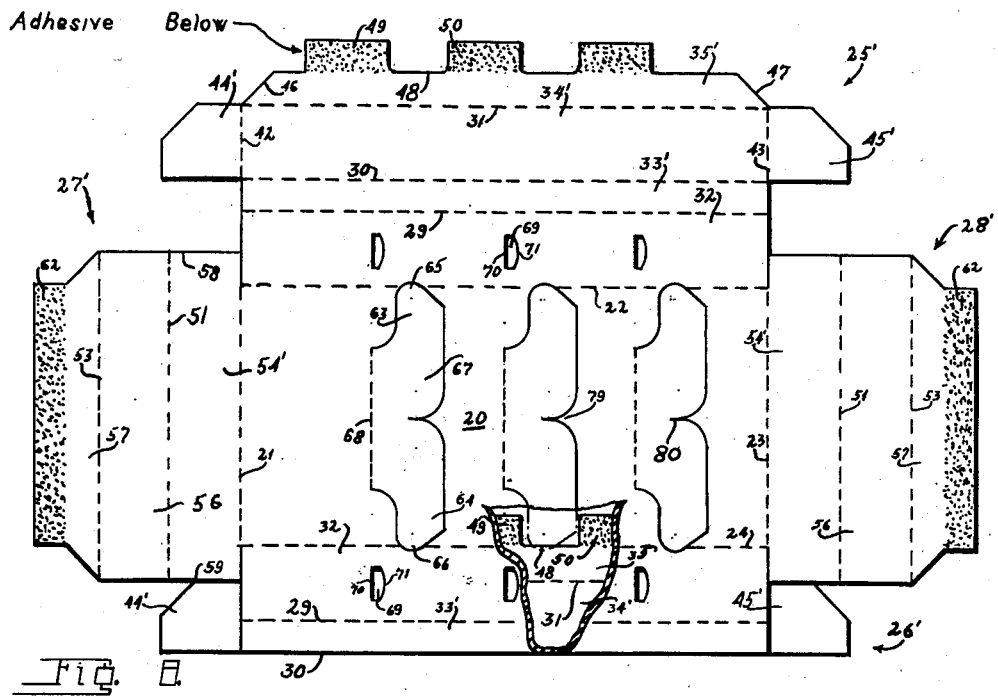
Fig. 8.
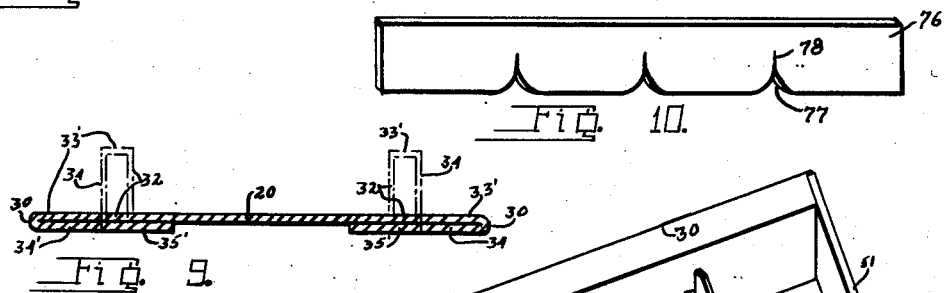
Fig. 10.
Fig. 9.
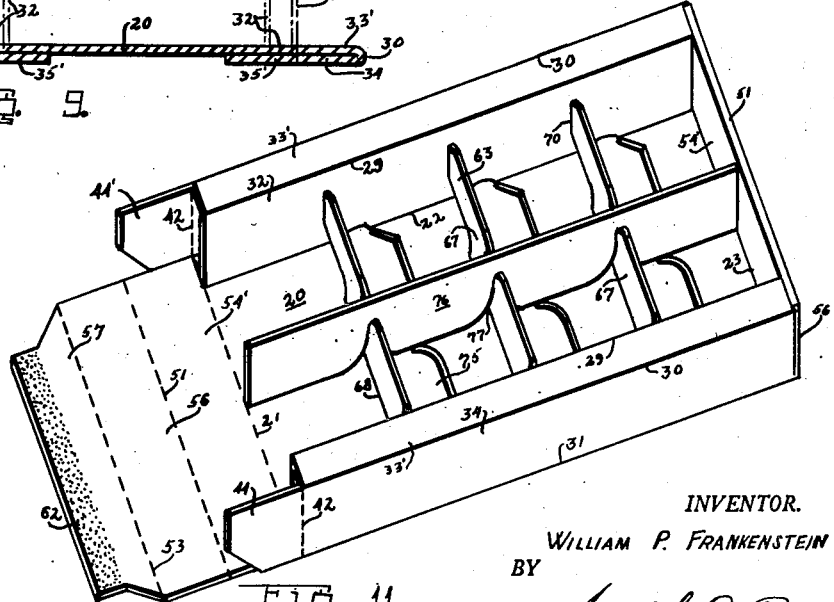
Fig. 11.
INVENTOR.
WILLIAM P. FRANKENSTEIN
BY
Joseph A. Rave
ATTORNEY Feb. 23, 1954 W. P. FRANKENSTEIN 2,670,123
CARTON
Filed July 28, 1949 7 Sheets-Sheet 5
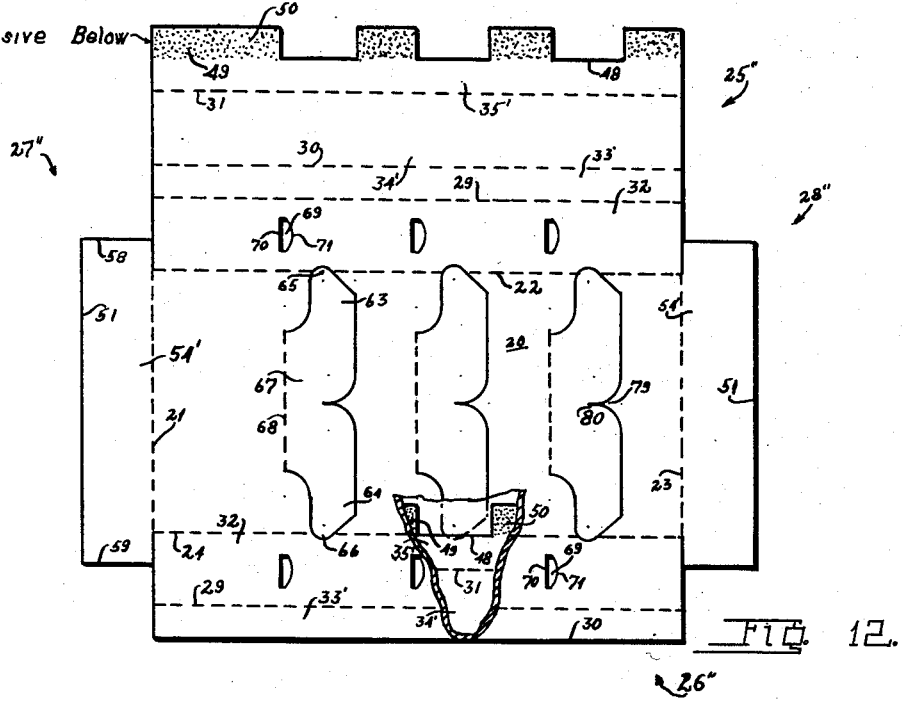
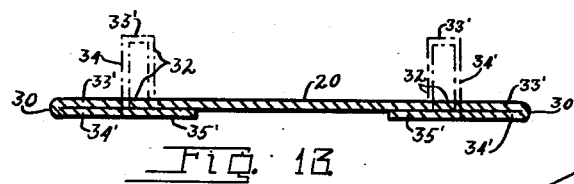
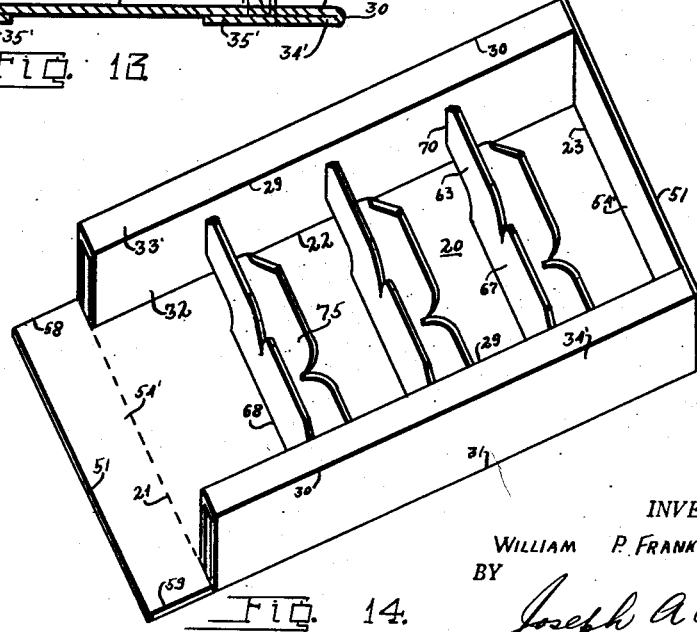
INVENTOR.
WILLIAM P. FRANKENSTEIN
BY
Joseph A. Rave
ATTORNEY

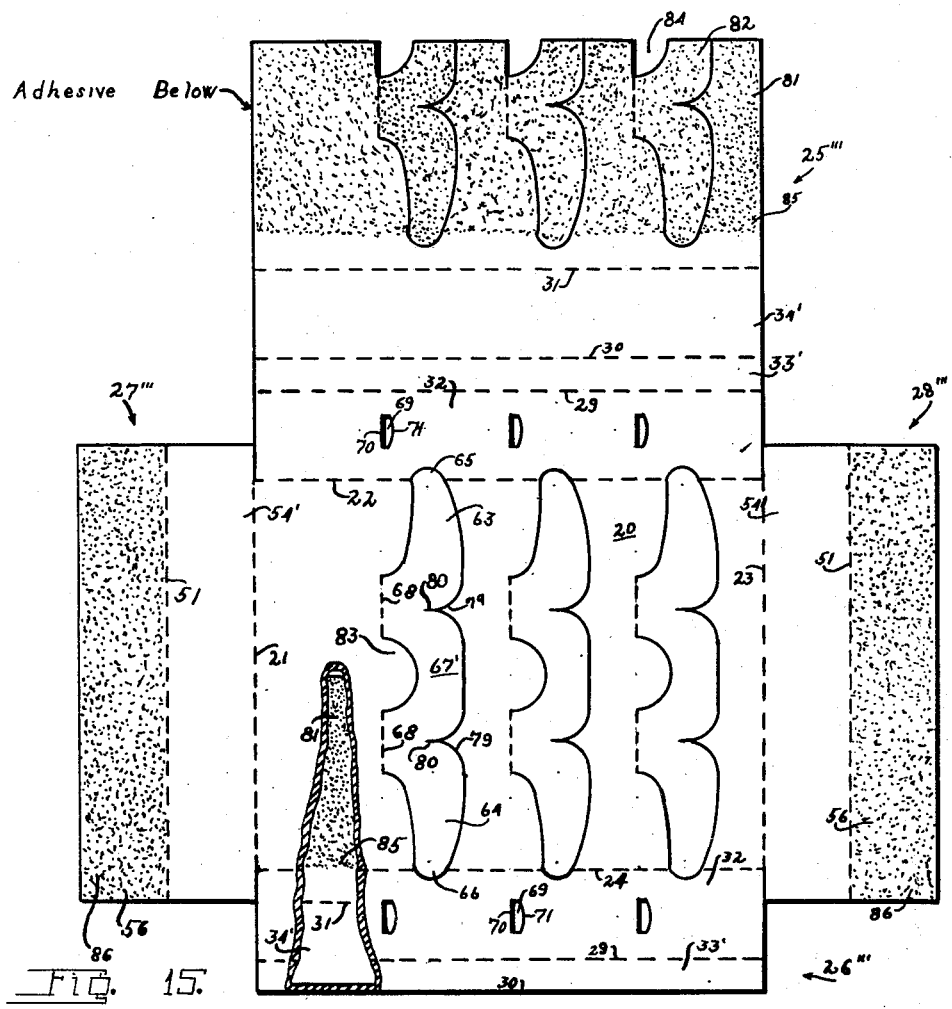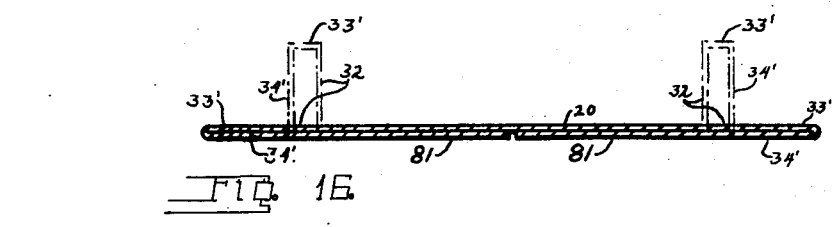

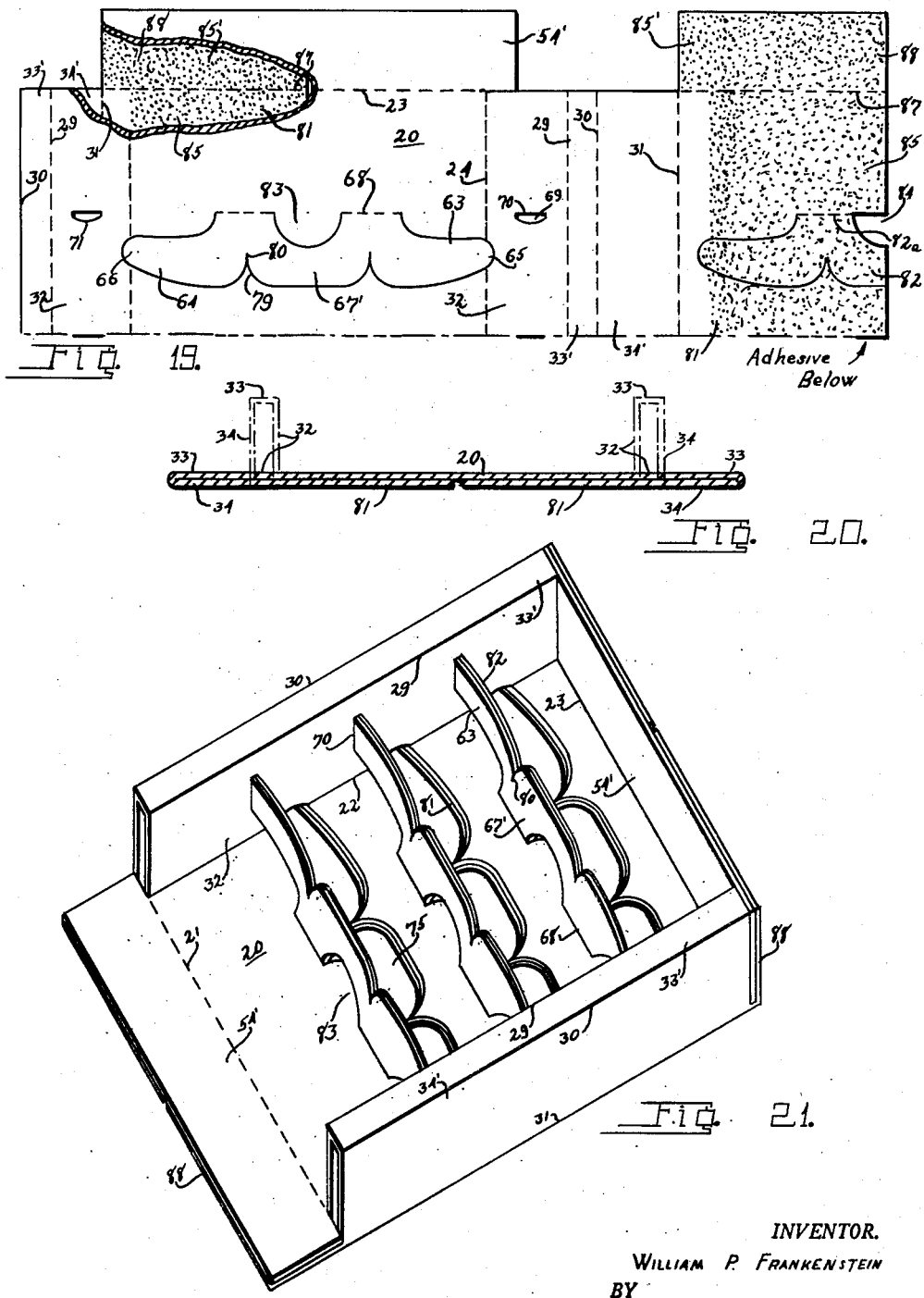

Patented Feb. 23, 1954

2,670,123

UNITED STATES PATENT OFFICE 2,670,123

CARTON

William P. Frankenstein, Cincinnati, Ohio

Application July 28, 1949, Serial No. 107,329

10 Claims. (Cl. 229—27)

This invention relates to improvements in cartons and particularly to knocked-down cartons, that is, cartons so manufactured that they are partially erected and then flattened requiring the user to merely raise the same from their flattened condition and when the parts are in said raised position they are secured to one another and which erected carton is provided with transverse partitions.

Transversely partitioned cartons in and of themselves are old and well known, such as used in connection with eggs, bottled goods, and the like, but these cartons have the partitions formed from extraneous portions or material added to the blank of the carton while the transverse partitions of the present invention are provided from the same blank as that from which the carton proper is formed without any added material or added parts. The transversely partitioned carton of this invention discloses modifications over and improvements upon the disclosure in applicant's pending application Serial No. 89,891, filed October 27, 1949, and the said disclosure in the present application is based on the general disclosure in Freel et al. Patent 2,447,243, issued August 17, 1948.

The principal object of this invention is the provision of a carton having hollow walls with which cooperate flaps to provide transverse partitions for the carton proper.

Another object of this invention is the provision of a foldable or knocked-down carton which when erected and having the erected parts secured in position provides a carton which is equivalent in stability and strength to the so called set-up carton and which has transverse partitions to provide compartments in the carton.

Another object of this invention is the provision of a knocked-down or foldable carton for accomplishing the foregoing objects and which carton can be set up to have transverse partitions supplied from the main panel or bottom of the carton and which carton may be set up or erected without the use of a special jig or other set up equipment.

A further object of this invention is the provision of a carton for accomplishing the foregoing objects that is economical to produce, set up and use.

It is also an object of this invention to provide a knocked-down or foldable carton formed from a single blank and having transverse partitions with bounding walls that comprise inner and outer wall members and wherein the visible surface of the carton bottom, inner and outer wall members, and opposite faces of the transverse partitions expose the same side of the blank and which side may either have a preferred finish or a surface impenetrable or resistant to penetration by grease, liquids, and the like.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a plan view of a blank partially extended and partially folded from which one form of the carton of the present invention may be made.

Fig. 2 is a transverse sectional view of a completely folded blank illustrating same in the position in which it is shipped to the user.

Fig. 3 is a perspective view of a partially erected carton from the blank of Figs. 1 and 2.

Fig. 7 is a bottom plan view of the erected carton of Fig. 3.

Fig. 8 is a plan view of a partially folded and partially extended blank similar to Fig. 1 showing modifications in said blank.

Fig. 9 is a transverse sectional view through a completely folded blank of Fig. 8.

Fig. 10 is a perspective view of a strip that may cooperate with any form of carton of the present invention for dividing the compartments.

Fig. 11 is a perspective view of a partially erected carton from the blank of Fig. 8 showing in operative position the strip or blank of Fig. 10.

Fig. 12 is a plan view similar to Figs. 1 and 8 of a blank partially folded and partially extended showing additional modifications over Fig. 8.

Fig. 13 is a transverse sectional view of a completely folded blank of Fig. 12.

Fig. 14 is a perspective view of a partially erected carton from the blanks of Figs. 12 and 13.

Fig. 15 is a plan view of a blank for providing a modified carton over that of Figs. 12 and 14 and in which the erected carton presents the same side or face of the blank in each face of the transverse partition.

Fig. 16 is a transverse sectional view through a completely folded blank of Fig. 15.

Fig. 17 is a perspective view of a partially erected carton from the blank of Figs. 15 and 16.

Fig. 18 is a longitudinal sectional view through a completely erected carton as seen from line 18—18 on Fig. 17.

Fig. 19 is a plan view of a half blank partly folded showing modification over the disclosure of the blank disclosed in Fig. 15.

Fig. 20 is a transverse sectional view through a completely folded blank of Fig. 19.

Fig. 21 is a perspective view of a partially erected carton from the blank of Figs. 19 and 20.

Throughout the several views of the drawings similar reference characters are employed to denote the same or similar parts.

Figure 4:
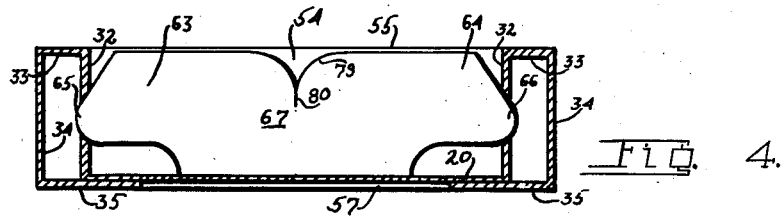
Fig. 4 is a transverse sectional view through an erected carton as seen from line 4—4 on Fig. 3.
Figure 5:
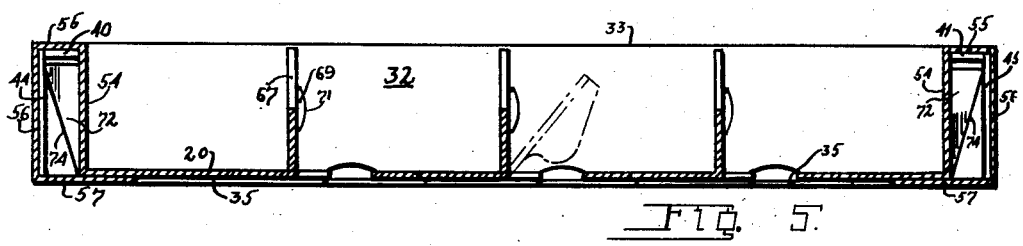
Fig. 5 is a longitudinal sectional view through the carton of Fig. 3 as seen from line 5—5 on said Fig. 3.
Figure 6:
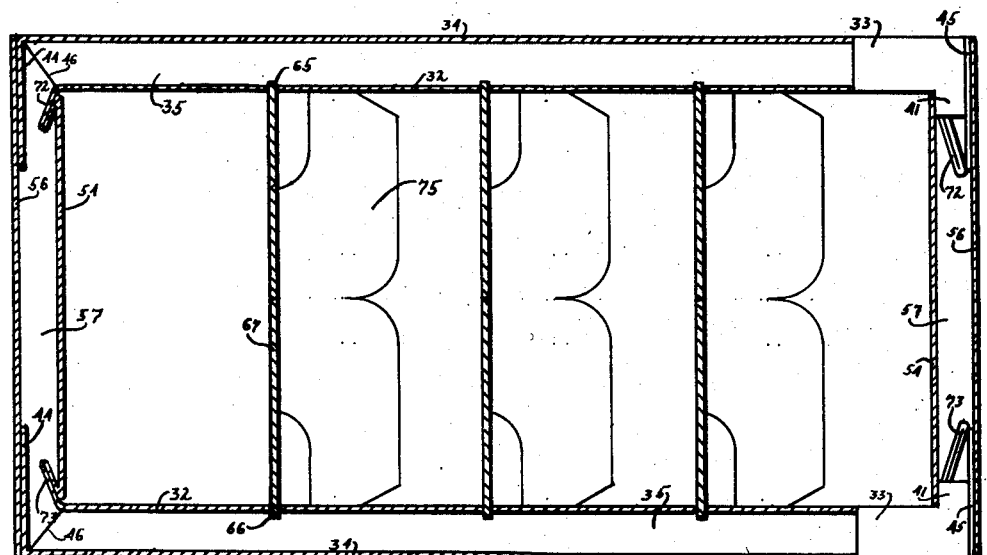
Fig. 6 is an enlarged horizontal sectional view through the erected carton as seen from line 6—6 on Fig. 3.

Several modifications of the invention are disclosed in the drawings and they will be successively described insofar as they differ from the modification illustrated in Figs. 1 to 7, inclusive, which will now be described in detail.

The blank in Fig. 1 comprises a main or bottom panel 20 having its sides defined by score or fold lines 21, 22, 23 and 24. The score or fold lines 22 and 24 respectively, integrally, hingedly connect with the bottom 20 similar extensions 25 and 26 which in the erected carton form the side walls thereof while the score or fold lines 21 and 23 respectively, integrally, hingedly connect with the main or bottom panel 20 similar extensions 27 and 28 which in the erected carton form the end walls. It will be understood that the designation of side and end walls is merely for the purpose of description as these terms are frequently used interchangeably, the term side wall generally defining the longer of the walls.

Since the extensions 25 and 26 are substantially identical, it is deemed sufficient if but one of them be described in detail for the both. Accordingly, extension 25 is provided with a plurality of score or fold lines 29, 30 and 31 thereby providing, between the main or bottom panel score line 22 and the end of the extension, panels 32, 33, 34 and 35. In the erected carton the panel 32 forms the side wall inner wall member which has its ends defined in part by score or fold lines 36 and 37 and in part by cut lines 38 and 39 which are respectively extensions of the score or fold lines 36 and 37. The panel 33 forms in the erected carton the side wall top wall member and is of a length greater than the length of the panel 32 having at its opposite ends inwardly projecting lugs 40 and 41 which are defined on their closed portions by the cut lines 38 and 39 of the side wall panel 32. The width of the lugs 40 and 41, as will subsequently be made clear, is equal to the end walls top wall members and cooperate with said end walls top wall members in the final erection of the carton. The panel 34 in the erected carton forms the side wall outer wall member and is of a length substantially equal to that of the panel 33 of side wall top wall member and the said panel 34 has its ends defined by score or fold lines 42 and 43. The score or fold lines 42 and 43 respectively, integrally, hingedly connect with the panel 34 tucking flaps 44 and 45. The remaining panel 35 in the erected carton forms the side walls bottom wall member and is illustrated as having the ends thereof biased or inclined as at 46 and 47 which, however, is not necessary except as it is required in cooperation with the end walls bottom wall members as will subsequently be made clear. The outer edge of the panel 35 is formed by a cut line 48 which provides a plurality of lugs or projections 49 which in the erected carton form glue or fastening lugs or flaps for securing the carton side wall outer wall member in position. The said glue flaps 49 have on their under side, as seen in Fig. 1, adhesive, indicated by the reference numeral 50.

The end wall extensions 27 and 28 again are substantially identical and it is deemed sufficient if but one of them be described in detail. Accordingly, extension 27 is provided between the score or fold line 21 and the end thereof with a plurality of score or fold lines 51, 52 and 53 thereby providing, in said extension, panels 54, 55, 56 and 57. In the erected carton, the panel 54 forms the end wall inner wall member and is of a length substantially equal to the width of the carton main or bottom panel 20 and the panel 54 has its ends defined by score or fold lines 58 and 59. The panel 56, in the erected carton, forms the end wall outer wall member and has its ends defined by cut lines and is of a length greater than that of panel 54 to the extent of the side walls top wall members 33 wherefore it bridges the distance between the side walls outer wall members or panels 34 as will be seen from Figs. 3 and 6 and as will be subsequently described. The intermediate panel 55 forms, in the erected carton, the end wall top wall member and has its ends biased or tapered as at 60 and 61 although this specific form need not be followed as the ends of the end wall top wall member panel 55 rests upon the side walls top wall members or panels 33 and by biasing these ends a neater appearance is given to the carton than would be the result if the corners remained on the said end wall. The remaining panel 57 constitutes the end wall bottom wall member and at the same time provides a glue flap portion to the undersurface of which is supplied adhesive indicated by the reference numeral 62.

The side walls inner wall members or panels 32 have their ends, as defined by the score or fold lines 36 and 37, adjacent to the ends of the end walls inner wall members or panels 54, as defined by the score or fold lines 58 and 59. Said adjacent score or fold lines integrally, hingedly connect with their respective panels corner pieces 72 and 73 which in the erected carton form tucking flaps. These corner pieces when erected form what is commercially known as "bellows corners" and for which reason they are provided, respectively, with a diagonal fold or score line 74 and the erection of which will be obvious from Fig. 3.

Disposed within the carton main or bottom panel 20 is one or more flaps adapted to be disposed normal to said panel and to extend transversely thereof. The said flaps may take any suitable or desirable contour, that shown in the drawings including arms 63 and 64 each of which terminate in a substantially reduced end or blunt point and respectively indicated by reference numerals 65 and 66. The flap, indicated as a whole by the reference numeral 67, has a base or bottom as a score or fold line 68 which is considerably shorter than the over all length of the flap which includes the ends 65 and 66. As will be seen from Fig. 1 the said ends or blunt points 65 and 66 are in effect formed from the inner, in the erected carton, lower, end of the side walls inner wall members or panels 32. This projection of the partitions ends 65 and 66 into the panels 32 is only for a distance to interlock the parts as will subsequently be made clear.

Each of the side walls inner wall members or panels 32 is provided with an elongated aperture 69, there being as many apertures in the side walls as there are partitions 67 formed in the carton main or bottom panel 20. It should be here noted that while each of the modifications in the drawings shows three partitions, this number may be increased or decreased and be within the spirit of the invention. The side walls inner wall members apertures 69 may take any suitable or desirable form that illustrated in the drawings being preferred as it provides a back face or shoulder 70 which is substantially normal to the base or bottom panel 20 when the side walls are erected. The other side of the aperture 69 is shown as having a substantially arcuate contour 71 thereby providing a greater opening at the mid-height of the aperture so that the end of the partition 67 may more readily insert itself in the aperture upon assembly as will be presently made clear.

After the blank has been cut and scored as just described adhesive 50 is applied to the lugs or flaps 49 whereupon the side wall extensions 25 and 26 are respectively folded on their score line 30 thereby bringing the said adhesive 50 on the glue flaps 49 into engagement with the under side of the main or bottom panel 20, that is, that portion of the bottom panel 20 that remains between the openings 75 therein after the partitions 67 are raised to their operative positions. The said lugs 49 are illustrated in their attached positions in Fig. 7 wherefore the partitions are free to be raised in the final erection of the parts. The blank is now in the condition as illustrated in solid lines in Fig. 2 in which condition it is shipped to the user for storage purposes and subsequent erection.

The user on desiring to erect the carton does so by upwardly folding the end wall flaps 27 and 28 to be in the position illustrated by flap 27 in Fig. 3. The side walls are now raised from their flat folded position to the positions illustrated in phantom lines in Fig. 2. It is understood that the raising of the side walls causes same to fold or bend on score or fold lines 22—24, 29, 30 and 31. In raising the side walls, the bellows corner pieces 72 and 73 were folded to the position illustrated by the said corner piece 72 in Fig. 3 and at the same time projected the side walls top wall members lugs 40 and 41 behind the upwardly projecting end wall extensions. The tucking flaps 44 and 45 and the bellows corners 72 and 73 are now folded to be transversely of the carton whereupon the end walls extensions 27 and 28 are successively folded on their score or fold lines 51, 52 and 53 to bring the panel 57 below the undersurface of the main or bottom panel 20. It is understood that the adhesive 62 was applied to the glue flap portion of the panel 57 prior to or during the folding of the extension so that the said adhesive is brought into operative engagement with the bottom or main panel 20 just inwardly of its end score or fold lines 21 and 23.

The purpose of and reason for biasing the ends of the side walls bottom panel 35 as illustrated at 46 and 47 is evident from Fig. 7 so as to prevent the overlapping thereof of the portion of the end wall bottom wall member or panel 57 and to bring the glue flap portion of said end wall extension panel into engagement with the bottom or main panel 20 throughout its length to obtain proper adhesive contact between these parts. It is readily evident that the ends of the side walls bottom wall members 35 may be left pointed and the normally overlapping portion of the end walls members panels 57 removed by a cut in alignment with the ends of the glue flap portion of said panel 57 or conversely the ends of the side walls extensions bottom wall members or panels 35 completely removed so that its length is no greater than that of the main or bottom panel 20 between the score or fold lines 21 and 23.

The transverse partitions or flaps 67 are now raised from their horizontal position. It will be understood that the ends 65 and 66 are slightly underlying the inner wall members or panels 32 wherefore a slight longitudinal bowing of the said partitions or flaps 67 will be effected during the upward raising thereof such as illustrated in phantom lines in Fig. 5. As soon as, however, the said partition or flap ends are aligned with or register with the side walls inner wall members apertures 69 they spring to their normal position and the ends 65 and 66 are thereby projected into the said openings. This springing or projecting of the said partition ends 65 and 66 is materially facilitated by the arcuate side 71 of said opening or aperture. In the final position the said transverse partitions rest against the aperture straight or normal side 70 as fully illustrated in the drawings. The carton is now in the erected position illustrated in Figs. 4 to 7, inclusive, and adapted to receive articles or goods in the several compartments formed between adjacent partitions and the outermost partitions and end walls.

Modifications disclosed in Figs. 8, 9 and 11 differ primarily from that in Figs. 1 to 7, inclusive, in that the end walls are of double thickness instead of spaced apart or hollow construction. Accordingly there is eliminated from extensions 27' and 28' the panel 55 and its defining score or fold line 52. Also the said extensions each has its panel 54', which forms the end wall inner wall member, of a length greater than that in Fig. 1, that is, of a length to span the carton substantially between the side wall outer wall members, as disclosed in Fig. 11, instead of the side wall inner wall members as disclosed in Fig. 3. The said end wall extensions 27' and 28' therefore have the panels 56 directly connected through score or fold line 51 with the panels 54'.

The said modification as illustrated in Fig. 8 has the side wall extensions 25' and 26' modified by having their panels 33', 34' and 35' shortened because of the elimination of the end wall top wall members or panels 55. In other words the said panels 35', 34' and 33' are made to the same length as the panel 32 which is to the length of the main or bottom panel between its end score or fold lines 21 and 23. This modification necessitates the removal from the panel 33 of the lugs 40 and 41 and also the removal of the bellows corner pieces 72 and 73.

The blank of Fig. 8 after being cut and scored is folded as illustrated in Fig. 9 for shipment to the user who upon desiring to place articles or goods therein follows substantially the same steps as above set forth except that the side walls are first raised from their folded position to be upstanding as shown in phantom lines in Fig. 9 whereupon the end walls extensions are raised and folded outwardly on their respective score or fold lines to enclose the tucking flaps 44 and 45 as above pointed out. In the modification, and as clearly shown in Fig. 11, the raising of the side walls provides a shoulder at the ends of the said side walls inner wall members or panels 32 and top wall members or panels 33' against which the ends of the end walls inner wall members or panels 54' abut prior to the positioning of the tucking flaps 44 and 45 to be subsequently enfolded by the end walls panels or wall members 54' and 56 as illustrated by the righthand end of Fig. 11.

There is disclosed in Fig. 11 a longitudinal partition 76 for dividing the carton compartments and which is further illustrated in Fig. 10. As shown in Fig. 10 the partition strip 76 is a length of material, cardboard, paper or the like, having at intervals notches 77 formed therein with each notch terminating in a slit or cut 78. The said notches 77 are spaced to correspond with the spacing of the partition flaps 67 and are adapted to interlock with similar notches 79 formed in each partition flap 67 and which partition flap notches 79 terminate in a slit or cut 80.

It is to be understood that the partition flaps 67 of the modification in Figs. 1 to 7, inclusive, are each provided with a similar notch 79 for the partition strip 76. It should be here noted that the said partition flaps 67 may be provided with more than one notch 79 such for example as two such notches as illustrated in the modification of the blank in Fig. 15.

In the modifications of the carton as thus far described, the walls are each provided with co-operating means for locking the same in their erected positions. In the modification illustrated in Figs. 12, 13 and 14 an extraneous means or wrapping must be employed for retaining the walls in erected position wherefore the blank has been reduced to its simplest form. The said blank of Fig. 12 is modified over that disclosed in Fig. 8 to the extent that the side wall extensions 25" and 26" have eliminated therefrom all tucking flaps while the end wall extensions 27" and 28" have been reduced to a single panel 54'. The blank of Fig. 12 is otherwise substantially identical with that of Fig. 8 and is folded to have its side wall extensions 25" and 26" folded and secured to the undersurface of the main or bottom panel 20 in the same manner as above described whereupon the blank is in the folded position of Fig. 13 to be shipped to the user for ultimate erection.

The user in erecting the carton follows substantially the same steps as above described in raising the side walls from their flat folded position to an upstanding position whereupon the partition flaps and end walls are positioned to receive goods or articles in the several compartments. The entire package is then subjected to a wrapping operation which may be of any suitable or desirable type of clear transparent material or opaque material.

In the modification disclosed in Figs. 15, 16, 17 and 18 the same side or face of the material from which the carton is formed is presented on both sides of the transverse partition as well as on the side and end walls. As shown in Fig. 15 the blank has the side wall extensions 25''' and 26''' modified to the extent that a panel 81 is substituted for the panel 35 of the blank of Fig. 1 and is connected to the side wall panel or outer wall member 34' through the score or fold line 31. The panel 81 is of a width substantially equal to one-half of the width of the main panel or carton bottom 20 plus the width of the carton side wall top wall member or panel 33'. The panel 81 is provided within its borders with tabs or flaps 82 each corresponding with the flap 67' in the main or bottom panel 20 except that each flap 82 is only one-half of said bottom panel flaps insofar as length is concerned. Each of the flaps 82 is formed to a vertical dimension substantially identical to the vertical dimension of the flaps 67' in carton main or bottom panel 20 for a purpose which will presently be made clear, said flaps 82 being connected to the panel 81 by a cut and score line or a line of perforations 82a.

As shown in Fig. 15 the transverse partition flaps 67' are each cut so as to allow a tab 83 to remain in the plane of the carton bottom 20 after the said partition flap has been raised to its normal position and to avoid interference the flap or panel 81 is provided with a cut out portion 84 that underlies each of the lugs 83.

The end wall extensions 27''' and 28''' are modified to the extent of including the end wall inner wall member or panel 54' and the end wall outer wall member or panel 56 with the score or fold line 51 therebetween. Each of the panels 54' and 56 is of the same length and height and is utilized to form the end wall to provide means with a double thickness.

After the blank has been cut and scored as above described the panel 81 is provided on its undersurface, as seen in Fig. 15, with adhesive 85 while the panel 56 is likewise supplied on its undersurface with adhesive 86. The blank is then folded by folding the side wall extensions 25''' and 26''' respectively on their score or fold lines 30 which brings the portion of the panel 81 that has adhesive applied thereto into contact with the undersurface of the carton main or bottom panel 20, which, as shown in Fig. 15 in connection with the extension 26''', effects this face contact from the side score lines 22 and 24 to the longitudinal medium line of the carton main panel or bottom 20. The end wall extensions 27''' and 28''' likewise have their panels 56 respectively folded on their score or fold lines 51 thereby bringing the said panels 56 into face contact with the end wall inner wall members or panels 54' with the adhesive 86 therebetween. The blank is then in the folded condition of Fig. 16 whereupon it is shipped to the user for subsequent erection and use.

The user in desiring to set up the carton as illustrated, in the main, in Fig. 17 follows substantially the erecting steps as described above in erecting any one of the several modifications of the invention herein disclosed. As will be readily understood the raising of the transverse partition flaps 67' from the flat to the upstanding positions will automatically carry with them the partition flaps 82 in the panels 81, respectively, of side wall extensions 25''' and 26''' as shown most clearly in Figs. 17 and 18. It will be noted from Fig. 18 that the transverse partition flaps 82 of the panels 81 have their upper edges in the same plane as the upper edges of the flaps 67'. By this construction the composite partition flaps, comprising the main panel partition flaps 67' and panels partitions half flaps 81, presents to the observer the same or finished side of the material from which the carton is made.

It should be here noted that this side of the material from which the carton is made may be the standard finish or it may include coating which is substantially impenetrable or at least resists penetration by moisture or grease or other liquids or fluids which may be on the exterior surface of the articles packed in the carton. For example, the carton after being assembled, either as shown in Fig. 17 or after so assembled and provided with longitudinal dividing strips such as shown in Figs. 10 and 11, may have packed therein candies, bakery goods, or the like, which may have an exterior coating or chocolate or soft grease base icings which would penetrate the normally porous cardboard material from which cartons are generally made.

The modification illustrated in Figs. 19, 20 and 21 differs from that illustrated in Figs. 15 to 18 in that the end walls outer wall members are formed from panels included in the side walls extensions instead of the end walls extensions.

Specifically, each side wall extension has its panel 81' defined by a cut and score lie or a line of perforations 87 which integrally, hingedly connects with said ends of the panel 81' a flap 88 which has applied thereto adhesive 85', applied at the time the adhesive 85 is applied to the panel 81.

It will be readily seen that the folding of the side wall extensions, respectively, on their score or fold lines 39 automatically brings the flaps 88 into contact with the undersurface of the end walls flaps or inner wall members 54'. The blank of Fig. 19 is now in the folded position of Fig. 20 ready for shipment to the user for erection by him.

It should be noted that the half partition flaps 82 of the blanks of Figs. 15 and 19 and the end wall outer wall members of Fig. 19 are respectively connected with their adjacent members by cut and score lines or lines of perforations which are desirable to enable said flaps and panels to make the sharp bends necessary in setting the same up in the erected cartons.

From the foregoing, it will now be appreciated that there has been provided a box or carton for accomplishing the objects initially set forth.

What is claimed is:

1. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, and end walls hingedly connected to the remaining edges of the bottom panel.

2. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, and end walls hingedly connected to the remaining edges of the bottom panel, each comprising a wall member of a length to span the distance between the side outer wall members with said end walls abutting, at least, the said side outer wall members when in erected position.

3. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, and end walls hingedly connected to the remaining edges of the bottom panel, each comprising a wall member of a length to span the distance between the side outer wall members with said end walls abutting, at least, the said side outer wall members when in erected position, and an additional end wall member integrally, hingedly connected with the top of the first mentioned end wall member.

4. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, end walls hingedly connected to the remaining edges of the bottom panel, each comprising a wall member of a length to span the distance between the side outer wall members with said end walls abutting, at least, the said side outer wall members when in erected position, an additional end wall member integrally, hingedly connected with the top of the first mentioned end wall member and adapted to be disposed in face contact with and exteriorly of the said first mentioned end wall member, tucking flaps at the ends of the side outer wall members adapted to be disposed transversely of the bottom panel and enfolded between the end wall members, and glue flaps at the lower ends of the side outer wall members and end outermost wall members, adapted to be permanently secured to the underside of the bottom panel.

5. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, end walls hingedly connected to the remaining edges of the bottom panel, each comprising inner, outer, top and bottom wall members, and glue flaps at the lower ends of said side and end outer wall members for permanent attachment to the undersurface of the bottom panel.

6. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said reduced ends, respectively, projecting into the space between the inner and outer wall members of said side walls, end walls hingedly connected to the remaining edges of the bottom panel, each comprising inner, outer, top and bottom wall members, said side and end inner wall members each being of a length substantially equal to the contiguous portion of the bottom panel, said side and end top and outer wall members being respectively of an effective length to embrace the ends of the adjacent side and end top and outer wall members, said side top wall members each having at their ends a lug projecting toward one another to underlie the adjacent end top wall member, and glue flaps at the lower ends of the side and end bottom wall members for permanent attachment to the undersurface of the bottom panel.

7. In a carton of the class described a bottom panel, side walls from two opposed edges of the bottom panel, each side wall including inner, outer, top and bottom wall members with the inner wall members integrally, hingedly connected with the bottom panel to upstand therefrom and with said inner and outer wall members spaced from one another by the top wall member, said bottom panel and side walls being formed from a single blank with score lines defining the bottom panel from the side inner wall members, a transverse partition flap formed in the bottom panel and having reduced ends formed in the side inner wall members, said partition flap arranged to upstand normal to the bottom panel and transversely thereof, said side inner wall members having opposed apertures therein to receive the partition flap reduced ends and with said ends, respectively, projecting into the space between the inner end outer wall members of said side walls, end walls hingedly connected to the remaining edges of the bottom panel, each comprising inner, outer, top and bottom wall members, said side and end inner wall members each being of a length substantially equal to the contiguous portion of the bottom panel, said side and end top and outer wall members being respectively of an effective length to embrace the ends of the adjacent side and end top and outer wall members, said side top wall members each having at their ends a lug projecting toward one another to underlie the adjacent end top wall member, glue flaps at the lower ends of the side and end bottom wall members for permanent attachment to the undersurface of the bottom panel, and tucking flaps at the ends of one of the inner and outer wall members of each side wall adapted to extend toward one another and be enfolded by the end inner and outer wall members.

8. In a carton of the class described a bottom panel, extensions from two opposed edges of said bottom panel each scored to provide in the erected carton an inner wall member integrally, hingedly connected with the bottom panel, a top wall member integrally, hingedly connected with the inner wall member, an outer wall member integrally, hingedly connected with the top wall member, a combined bottom wall member and glue flap integrally, hingedly connected with the outer wall member and wherein the glue flap is of substantially one-half the area of the bottom panel with said glue flaps secured to said bottom panel to provide through each extension an upstanding side wall having its inner and outer wall members spaced from one another by its top wall member, said bottom panel and glue flaps having formed therein a composite transverse partition flap with reduced ends respectively formed in the side inner and bottom wall members, said partition flap being adapted to upstand normal to the bottom panel and transversely thereof, said side inner wall members having opposed apertures therein to receive the partition flap ends and with said ends, respectively, projecting into the space between the inner and outer wall members of said side walls, and end walls hingedly connected to the remaining edges of the bottom panel.

9. In a carton of the class described a bottom panel, extensions from two opposed edges of said bottom panel each scored to provide in the erected carton a side wall including an inner wall member integrally, hingedly connected with the bottom panel, a top wall member integrally, hingedly connected with the inner wall member, an outer wall member integrally, hingedly connected with the top wall member, a combined bottom wall member and glue flap integrally, hingedly connected with the outer wall member and wherein the glue flap is of substantially one-half the area of the bottom panel with said glue flaps secured to said bottom panel and said side walls each having its inner and outer wall members spaced from one another by its top wall member, said bottom panel and glue flaps having formed therein a composite transverse partition flap with reduced ends respectively formed in the side inner and bottom wall members, said partition flap being adapted to upstand normal to the bottom panel and transversely thereof, said side inner wall members having opposed apertures therein to receive the partition flap ends and with said ends, respectively, projecting into the space between the inner and outer wall members of said side walls, and end walls hingedly connected to the remaining edges of the bottom panel, comprising an inner and an outer wall member secured in back to back engagement.

10. In a carton of the class described a bottom panel, extensions from two opposed edges of said bottom panel each scored to provide in the erected carton an inner wall member integrally, hingedly connected with the bottom panel, a top wall member integrally, hingedly connected with the inner wall member, an outer wall member integrally, hingedly connected with the top wall member, a combined bottom wall member and glue flap integrally, hingedly connected with the outer wall member and wherein the glue flap is of substantially one-half the area of the bottom panel with said glue flaps secured to said bottom panel to provide through each extension an upstanding side wall having its inner and outer wall members spaced from one another by its top wall member, and an end wall outer wall member integrally, hingedly connected with each end of the glue flap, said bottom panel and glue flaps having formed therein a composite transverse partition flap with reduced ends respectively formed in the side inner and bottom wall members, said partition flap being adapted to upstand normal to the bottom panel and transversely thereof, said side inner wall members having opposed apertures therein to receive the partition flap ends and with said ends, respectively, projecting into the space between the inner and outer wall members of said side walls, and end inner wall members hingedly connected to the remaining edges of the bottom panel adapted to be in back to back contact with end outer wall members and secured in said back to back engagement.

WILLIAM P. FRANKENSTEIN.

References Cited in the file of this patent

UNITED STATES PATENTS

| Number | Name | Date |
|---|---|---|
| 1,794,124 | Sugarman | Feb. 24, 1931 |
| 2,329,866 | Van Sickels | Sept. 21, 1943 |
| 2,334,985 | Berry | Nov. 23, 1943 |
| 2,394,850 | Evans | Feb. 12, 1946 |
| 2,397,135 | Frankenstein | Mar. 26, 1946 |
| 2,410,486 | Evans | Nov. 5, 1946 |
| 2,447,243 | Freel | Aug. 17, 1948 |
| 2,495,807 | Buttery | Jan. 31, 1950 |